No. 6,984.

E. BUSSEY.

COOKING-STOVE.

3 Sheets—Sheet 1.

Reissued March 7, 1876.

WITNESSES

Chas. A. W. Leod

Chas. H. Gunter

By

INVENTOR

Eck Bussey

N. PETERS, PHOTO-LITHOGRAPHER, WASHINGTON, D. C.

3 Sheets—Sheet 2.

E. BUSSEY.

COOKING-STOVE.

No. 6,984.

Reissued March 7, 1876.

WITNESSES

Chas A. Wood

Chas W. Austin

By

INVENTOR

Esek Bussey

N. PETERS, PHOTO-LITHOGRAPHER, WASHINGTON, D. C.

3 Sheets—Sheet 3.

E. BUSSEY.

COOKING-STOVE.

No. 6,984.

Reissued March 7, 1876.

WITNESSES

Chas A. W. Leod

Geo. H. Austin

By

INVENTOR

Esek Bussey

N. PETERS, PHOTO-LITHOGRAPHER, WASHINGTON, D. C.

UNITED STATES PATENT OFFICE.

ESEK BUSSEY, OF TROY, NEW YORK, ASSIGNOR OF ONE-HALF INTEREST TO CHAS. A. McLEOD.

IMPROVEMENT IN COOKING-STOVES.

Specification forming part of Letters Patent No. 56,686, dated July 24, 1866; reissue No. 6,785, dated December 7, 1875; reissue No. 6,984, dated March 7, 1876; application filed February 15, 1876.

*To all whom it may concern:*

Be it known that I, ESEK BUSSEY, of the city of Troy, Rensselaer county, and State of New York, have invented an Improved Method of Constructing Cooking-Stoves in which a water-reservoir is heated by the arrangement and formation of a vertical chamber back of the rear vertical flues and exit-pipe of the stove, of which the following is a specification:

The nature of my invention consists in the application, to that class of cooking-stoves as have water-reservoirs arranged back of the rear vertical flues, of a vertical plate located between the rear oven-wall and the front wall of the water-reservoir, and so arranged by its intermediate position that it will form a rear wall of the vertical flues opposite the reservoir front wall, and also inclose a vertical heating-chamber against the front of the reservoir and back of the exit pipe of the stove. It also consists in connecting and combining a chamber so located and formed with the ascending vertical flue of the stove in such a manner that the heated air and gases passing through the flue will expand into the chamber through openings, and be returned to the flue, with which the chamber is connected through apertures, after having passed up through the chamber to heat the reservoir. It also consists of an additional means to further heat the reservoir and disconnected from the former, and which is produced by the rearward extension of the flue strips back to the descending flues, so as to inclose spaces between these flues and the reservoir, with the spaces so inclosed in communication with the descending flues, that the heated air and gases passing through the flues may expand into the spaces.

Figure 1:
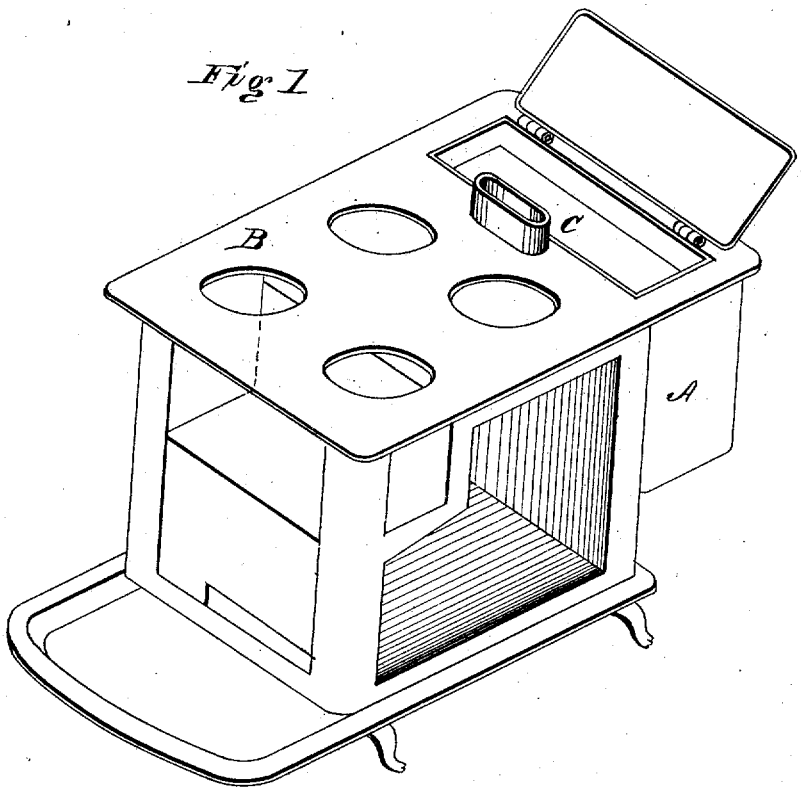
Figure 3:
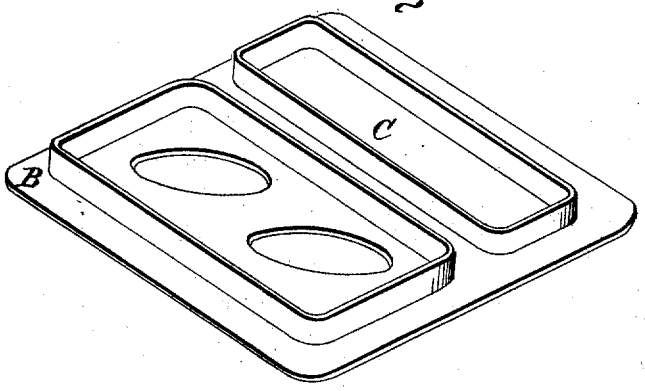
Figure 2:
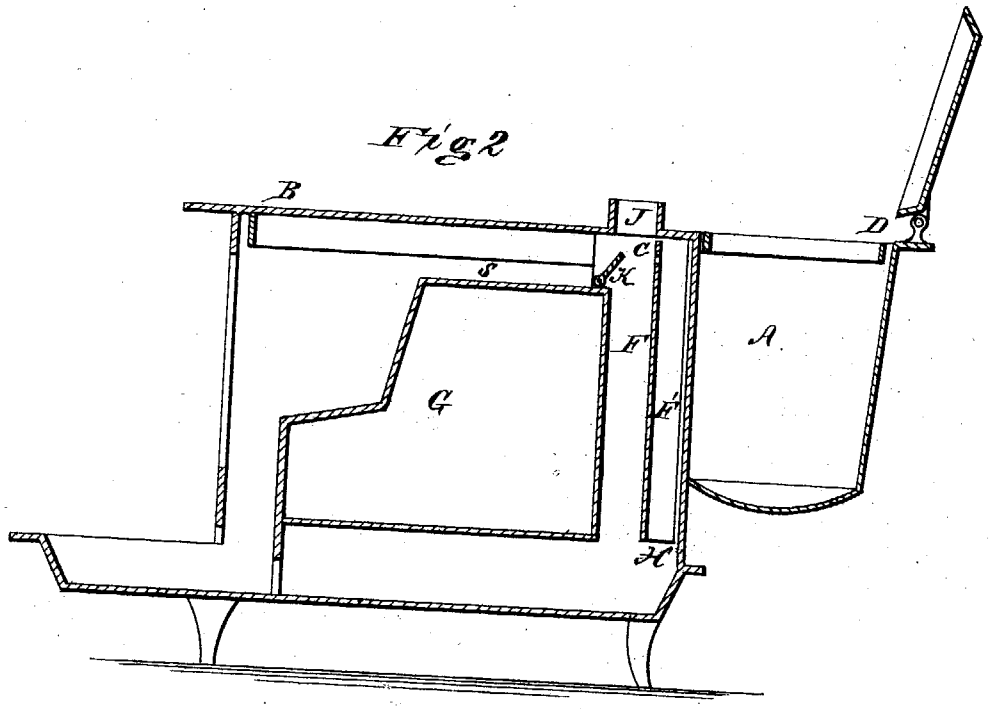
Figure 4:
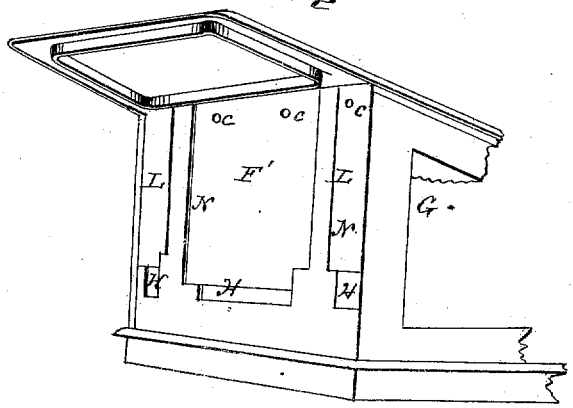
Figure 5:
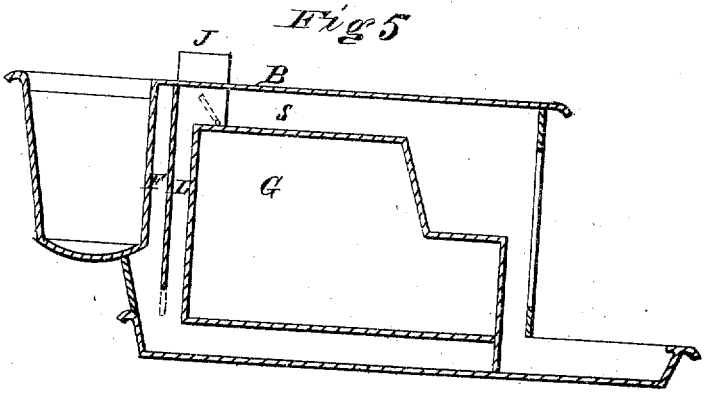

In the accompanying drawings, in which corresponding parts are designated by the same letters, Figure 1 shows a perspective view of a cooking-stove, with a reservoir located behind the ordinary rear flue-space of the stove. Fig. 2 illustrates a vertical longitudinal section through the ascending flue of the stove. Fig. 3 shows the manner of forming the top plate of the stove. Fig. 4 exhibits a perspective view of the rear part of the stove, with the reservoir removed, in order to fully illustrate the hot-air vertical chamber and flue-strips. Fig. 5 designates a vertical longitudinal section through the descending flue of the stove.

These several parts of an ordinary diving-flue cook-stove, as arranged in co-operating connection, are designated by letter-reference as follows.

G shows the location of the oven; K, the damper, which, when open, allows the heat to pass directly to the exit-pipe, and when closed causes the heated air and gases to pass down the corner descending flues. L designates a corner descending flue, and J shows the location of the exit-pipe. The letter B represents the top plate of the stove, and at S is shown the lateral flue over the top of the oven.

To the rear of the stove thus composed of these ordinarily-arranged co-operating parts is attached the water-reservoir A; but, as the manner of its attachment forms no part of the invention herein claimed or described, considered by itself, it requires no particular description. The reservoir A is shown as placed at the rear of a chamber, F′, and as resting on the plate I. Between the reservoir and rear oven-wall, at any distance that may be deemed desirable, is introduced the intermediate plate F, provided that it is located so that it will not impair the usual and well-known area capacity required for the rear vertical flues, and at the same time produce and inclose the vertical chamber F′ against the front wall of the reservoir back of the exit-pipe.

If it is desired to make a flue of less capacity the plate F may be moved forward to accomplish it, and form the plate I. The vertical length of the plate F may be varied to suit the depth of the reservoir-front, against which it is used to form the chamber F′.

The application of the vertical plate to thus inclose a vertical heating-chamber, and in such a location as to form the rear wall of the vertical flues opposite the reservoir-front, and back of the exit-pipe, forms the leading and principal feature of my invention.

At Fig. 4 of the accompanying drawings it will be seen that there is formed a broad vertical chamber, F′, open at the bottom for the heat to expand into the chamber from the ascending flue through the opening H, and after this entering portion of the moving current of heat has passed up through this chamber, between the vertical plate F and the reservoir-wall, it will return to the ascending flue through the openings formed in the vertical plate at *c c*.

It will be seen that the auxiliary heating-spaces inclosed back of the descending flues L L have no connection with the chamber F′, and perform their separate office in heating the reservoir in part, distinct and disconnected from the chamber. The spaces inclosed back of the descending flues, and between the rear wall of the flues and the reservoir, are connected with the flues which they are placed back of and opposite, so that the heated air and gases passing through the descending flues will expand into the spaces, and thus condition them to perform their separate and auxiliary office. The rearward extension of the flue-strips back of the vertical plate, to form these inclosures back of the descending flues, are designated at N N.

While the intermediate plate, thus located between the rear oven-wall and reservoir front wall, so applied, forms the back wall of the rear vertical flues opposite the reservoir, and incloses a heating-chamber against the reservoir, to provide a means for heating it, it and the chamber which it incloses perform another and very important office in the stove, and in the fact that a sluggish and impaired condition of the draft of the stove is prevented by their interposition, when the reservoir has been filled with cold water, and the full draft capacity of the stove is required to heat the oven. Under these conditions of use the cold surface of the reservoir would serve to impair and render the current sluggish when in contact with its chilled area.

Another and very important function is performed by the intermediate plate and vertical chamber which it forms, and this is, that when either the direct or revertible draft is employed, the passing heated air and gases do not impinge directly against the front of the reservoir at a point that, under ordinary contingencies, is least suited to stand its concentrated and reverberatory force, and this position of the reservoir is that which is near the top, and oftenest above the protecting influence of the water-line. On this account, and from the protection afforded by the intermediate plate and chamber, the reservoir can be made of thinner metal, and at much less cost, and be heated sufficiently as located.

When the oven of the stove is being used, and the direct-draft damper K is closed, the heated gases from the fire pass along the top of the oven through the flue S to the descending flues L L, down which the current, by the force of draft, is carried, to make the circuit of the oven-bottom, when it enters the ascending flue, from which it is, in part, expanded into the chamber F′ through the opening H, and, rising up between the vertical plate F and the reservoir-wall, returns to the ascending flue through the apertures C C. While thus making the circuit of the stove and passing through the descending flues, a portion of the heat is expanded into the spaces at the rear of these flues, and between them and the reservoir-wall.

I am well aware that, prior to my invention, reservoirs had been heated by passing the heat and gases into a chamber surrounding the reservoir, and located back of the rear vertical flues, with the exit-pipe in connection with the chamber, and back of the vertical end plate of the stove. This mode of heating a reservoir was found to be objectionable from the fact that it imposed a heavy reverberatory tax upon the draft capacity, and kept the water in the reservoir boiling—a condition not required or desirable.

Having thus described my invention, what I claim, and desire to secure by Letters Patent, is—

1. In a cooking-stove, a vertical heating-chamber placed back of the exit-pipe and vertical flues, and inclosed against the front wall of a water-reservoir by means of an intermediate vertical plate located between the rear oven-wall and the front wall of the reservoir, with the vertical intermediate plate forming the rear wall of the flues opposite the reservoir, substantially as and for the purposes herein described.

2. In a cooking-stove, a vertical heating-chamber placed back of the exit-pipe and rear vertical flues, in combination with the ascending flue, with the latter in communication with the chamber, substantially as and for the purposes described.

3. In a cooking-stove, the vertical plates N N, or their equivalents, to divide off the spaces opposite to and back of the descending flues, and between the rear wall of the descending flues and the reservoir front wall, with openings formed in the rear wall of the flues, connecting the flues with the spaces, substantially as and for the purposes described.

4. An intermediate plate between the reservoir and oven, with openings in the same for ingress or egress of gases of combustion, substantially as and for the purposes described.

Signed at Troy this 12th day of February, 1876.

ESEK BUSSEY.

Witnesses:

CHAS. A. MCLEOD,
CHAS. M. AUSTIN.